United States Patent [19]

Møller

[11] Patent Number: 5,784,951

[45] Date of Patent: Jul. 28, 1998

[54] PISTON WITH A SLIDE SHOE AND METHOD OF MANUFACTURING SAME

[75] Inventor: Henry Madsen Møller, Sønderborg, Denmark

[73] Assignee: Danfoss A/S, Nordborg, Denmark

[21] Appl. No.: 765,555

[22] PCT Filed: Jun. 27, 1995

[86] PCT No.: PCT/DK95/00269

§ 371 Date: Dec. 23, 1996

§ 102(e) Date: Dec. 23, 1996

[87] PCT Pub. No.: WO96/01947

PCT Pub. Date: Jan. 25, 1996

[30]  Foreign Application Priority Data

Jul. 8, 1994 [DK] Denmark ................. 0823/94

[51] Int. Cl.[6] ........................................... F16J 1/14
[52] U.S. Cl. ................. 92/187; 92/248; 92/128; 92/71; 74/60; 403/140
[58] Field of Search ................. 92/71, 187, 248, 92/128; 417/269; 74/60; 29/888.047, 888.048; 403/135, 139, 140

[56]  References Cited

U.S. PATENT DOCUMENTS

| 3,261,216 | 7/1966 | Woolfenoen | 74/60 |
|---|---|---|---|
| 3,874,275 | 4/1975 | Cunningham et al. | 92/248 |
| 4,043,255 | 8/1977 | Cunningham | 92/248 |
| 4,610,195 | 9/1986 | Cunningham et al. | 91/488 |
| 4,938,121 | 7/1990 | Melchior | 92/187 |
| 5,392,693 | 2/1995 | Engel et al. | 92/248 |
| 5,490,446 | 2/1996 | Engel | 403/140 |
| 5,601,009 | 2/1997 | Jepsen et al. | 92/71 |

Primary Examiner—Thomas E. Denion
Attorney, Agent, or Firm—Lee, Mann, Smith, McWilliams, Sweeney & Ohlson

[57]  ABSTRACT

A piston with a slide shoe for a hydraulic piston engine, where the slide shoe comprises a ball socket, and where the piston is arranged with a corresponding ball head, whereby these are joined in a ball-and-socket joint, and where at least partially the ball head is constituted of a spherical surface of a friction reducing material moulded onto and retained in relation the piston. As a consequence of the subsequent shrinking of the moulded-on, friction reducing material, a possibility is obtained of good fixation of the ball head on the piston, while at the same time a gap can be created between the ball socket and the ball head.

12 Claims, 2 Drawing Sheets

PISTON WITH A SLIDE SHOE AND METHOD OF MANUFACTURING SAME

BACKGROUND OF THE INVENTION

A piston with a slide shoe for a hydraulic piston engine, as well as a method of manufacturing same.

The present invention relates to a piston with a slide shoe for a hydraulic piston engine, where the slide shoe comprises a ball socket, and where the piston is arranged with a corresponding ball head, whereby these are connected in a ball-and-socket joint.

Hydraulic piston engines with such pistons with slide shoes may function for example according to the axial piston or radial piston principle. In both cases are the pistons placed slidingly in a cylinder block, and the slide shoe is held in contact against a guide surface in such a manner that the piston is moved in the cylinder block as a result of a relative movement of the cylinder block in relation to the guide surface, whereby the slide shoe slides across the guide surface.

In order to reduce friction between among other things the piston and the slide shoe, several constructions are known where one of the contact surfaces in the ball-and-socket joint connecting the piston and the slide shoe is made at least partially of a friction-reducing material.

U.S. Pat. No. 5,601,009 describes a piston with a slide shoe of the type described in the introduction, where the piston is provided with a ball head, which is connected to a slide shoe, on which slide shoe a ball socket is moulded on, so that together the ball socket and the ball head form the ball-and-socket joint between the piston and the slide shoe. Here the ball socket is moulded together with a second surface on the slide shoe, which forms the sliding surface of the slide shoe in relation to the guide surface, whereby an effective fixation of both the ball socket and the slide surface on the slide shoe is obtained.

SUMMARY OF THE INVENTION

The present invention is based on the preceding technology according to U.S. Pat. No. 5,601,009, and is a further development of same. The invention is particular by the fact that the ball head on the piston is constituted at least partially of a spherical surface of a friction-reducing material which is moulded on and held in relation to the piston.

By this method, as a consequence of the subsequent shrinking of the moulded-on, friction reducing material, a possibility is obtained of good fixation of the ball head on the piston, while at the same time a gap can be created between the ball socket and the ball head, which is not immediately obtainable by the technology according to U.S. Pat. No. 5,601,009, where, due to thermal shrinking of the material, the ball socket moulded on to the slide shoe will tend to dissociate itself from the slide socket and press against the ball head on the piston, which in the worst case may cause fracture of the moulded-on layer on the slide shoe during operation, because the moulded-on layer is constantly deformed in the areas abutting on the ball head.

In addition, the present invention makes it simpler to dimension the gap established between the moulded-on ball head on the piston and the slide socket. Among other things, this is important when low-viscosity pressure media such as water are used, where a relatively large gap is often required to obtain a satisfactory lubricating and cooling effect on the ball-and-socket joint.

The shrinkage of the moulded-on ball head on the piston is uniform over the whole spherical surface, because the moulded-on ball head can have a uniform layer thickness on the part of the ball formed on the piston.

However, according to the present invention it is possible to mould the ball head on so that it is secured in relation to the piston in or on a simple recess or similar, which is arranged on the piston, which can render production of the piston cheaper.

Furthermore, it is advantageous to fix the moulded on ball head in relation to the piston by geometrical locking.

The slide shoe is provided with moulded-on surfaces of friction reducing material on the sliding surface of the slide shoe against the guide surface and against a pressure unit holding the slide shoe against the guide surface.

A lubricating and/or cooling medium can be fed to the contact surface between the slide shoe and the guide surface.

The guide surfaces moulded on to the slide shoe can suitably be fixed in relation to the slide shoe by geometrical locking.

The invention also relates to a method of producing a piston with a slide shoe of the type described in the introduction, which method, is particular in that the piston and the slide shoe are first positioned in relation to each other, after which the ball head on the piston is finished by injection of friction reducing moulding material into the void between the piston and the ball socket of the slide shoe. By this method an especially simple production and assembly process is obtained, because the forming of the ball head and its mounting in the slide shoe are executed at the same time, for example in a plastic injection moulding machine.

The production and mounting process can be further simplified by simultaneous moulding of the friction reducing surface of the slide shoe in the same moulding process where the ball head is moulded.

By the method of moulding the ball head on the piston and the surface on the slide shoe as a coherent unit and then removing the parts of the moulded body connecting the ball head and the surfaces on the slide shoe, an especially simple moulding process is obtained, because an injection moulding tool with only one inlet nozzle may be used. In addition, the slide shoe is held rigidly in relation to the piston until the parts connecting the ball head and the surfaces on the slide shoe are removed, which may facilitate any intermediate machining of the mounted piston with a slide shoe.

By the method an especially advantageous production method is obtained for production of pistons with a slide shoe that are provided with a lubricating or cooling duct, because the lubricating/cooling duct can be formed simultaneously with the removal of the moulding material connecting the ball head and the surfaces on the slide shoe. The number of production and mounting processes is hereby reduced to a minimum.

BRIEF DESCRIPTION OF THE DRAWINGS

Suitable embodiments of the invention are described in the following in detail, with reference to the drawing, where.

DESCRIPTION OF THE PREFERRED EMBODIMENT

Figure 1:
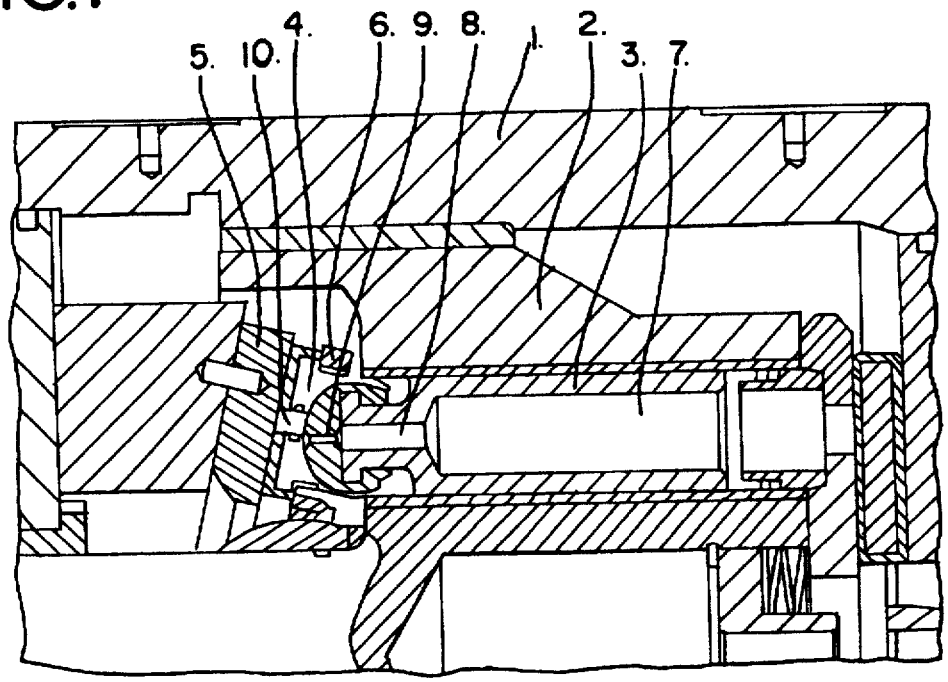
FIG. 1 is a sectional drawing of a part of a hydraulic axial piston engine with a piston and a slide shoe unit according to the invention.

With reference to FIG. 1 a hydraulic piston engine is shown, which has an exterior housing 1 and therein a rotatingly placed cylinder block 2, in which a number of pistons 3 are placed. The pistons 3 are equipped with slide shoes 4, so that there is a ball-and-socket joint between the slide shoe 4 and the piston 3. The slide shoe abuts on an oblique disk 5, and a holder 6 is arranged to ensure contact between the two. The oblique disk 5 is secured in relation to the housing 1.

Now if the cylinder block 2 is imagined to rotate in relation to the housing 1, this will cause a forced shift of the piston 3 in the cylinder block 2, as a consequence of the slide shoe 4 being held in contact against the stationary oblique disk 5.

Thus, since there is a forced connection between the movement of the piston 3 in the cylinder block 2 and the movement of the cylinder block 2 in relation to the housing 1, this allows the hydraulic piston engine to be used either as a hydraulic pump or as a hydraulic motor.

In the piston 3 a bore 7 may be arranged as shown, extending further in a bore 8, which is connected to a bore 10 in the slide shoe via a duct 9. In manner known this system can be exploited for hydraulic relief of the contact surfaces between the slide shoe 4 and the oblique disk 5, and possibly between the piston 3 and the slide shoe 4. The hydraulic relief may also cause lubrication or cooling of these slide surfaces in operation. The present invention relates more specifically to the piston 1 and the slide shoe 4, as shown in FIG. 1, and especially a ball-and-socket joint by which these are mounted as a unit.

Figure 2:
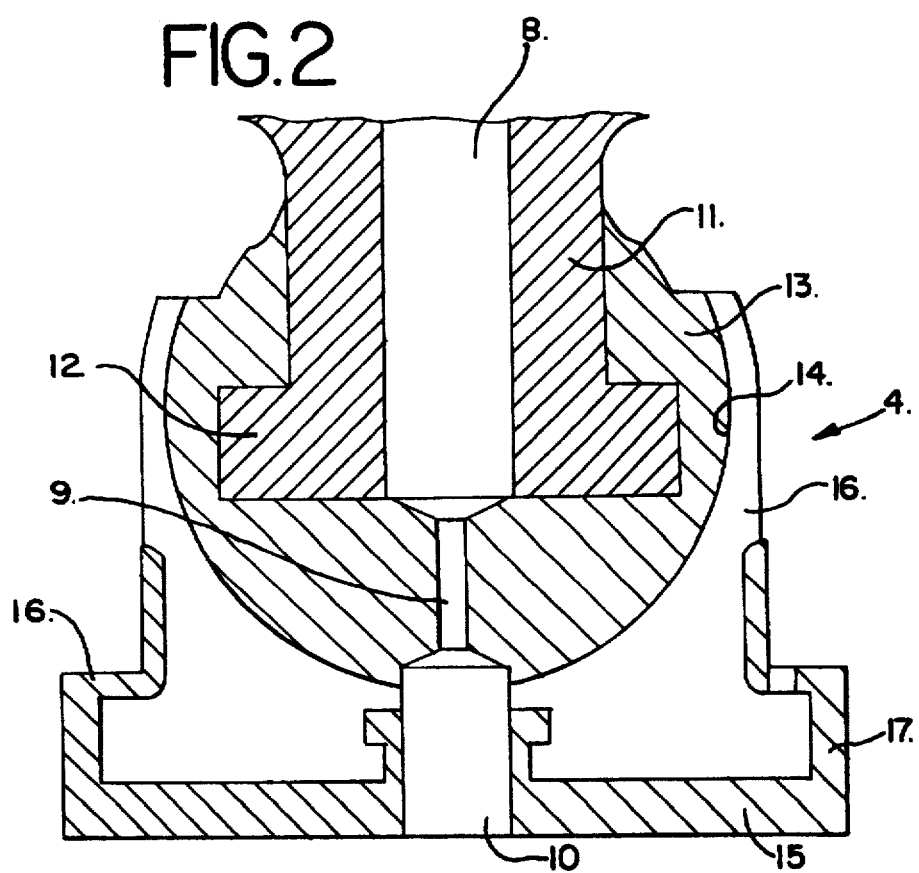
FIG. 2 is an enlarged sectional drawing of the ball head connecting the piston and the slide shoe according to FIG. 1.

FIG. 2 shows enlarged this ball-and-socket joint between the piston 3 and the slide shoe 4 according to FIG. 1, where the piston 3 alone is shown with the end on which the ball-and-socket joint 13 is formed.

Thus the piston 3 has a cylindrical part 11, which at its lower end is provided with a circular flange 12. On to the circular flange 12 is moulded a ball head of friction reducing material such as plastics. The ball head 13 is placed in a spherical socket 14 in the slide shoe 4, whereby the ball-and-socket joint between the slide shoe 4 and the piston 3 is formed. As shown, the moulded-on ball head 13 is provided with a duct 9, which connects a bore 8 in the piston 3 with a corresponding bore 10 in the slide shoe 4. Therefore, at small angular turns between the ball head 13 and the slide shoe 4, the bores 8, 10 and the duct 9 arranged in the ball head 13 will be able to conduct a hydraulic medium from the pressure side of the piston via the bore 8, the duct 9, and the bore 10 to the slide surface 15 on the slide shoe 4. FIG. 2 is shown with the bores 8 and 10 in a straight line, and in a similar manner it is shown in FIG. 1 how the bores 8 and 10, via the duct 9, are in connection with each other at a small angular turn between the piston 3 and the slide shoe 4.

Thus the slide shoe 4 has a support body 16, which forms the spherical socket 14. Additionally, moulded on to the slide shoe there is a layer of friction reducing material 17, which forms both the sliding surface 15 of the slide shoe 4 and the contact surface 21, which abuts on the holder 6, as shown in FIG. 1.

When moulding the ball head 13 on to the piston 3 with the cylindrical part 11 with the flange 12, the moulded-on ball head 13 will press around the cylindrical part 11 and the flange 12 due to thermal shrinking, whereby an extremely secure connection is formed between these.

In the moulding process, which may be a plastic injection moulding process, the ball head 13 can be formed by placing the support body 16 on the slide shoe 4 and the piston 3 facing each other in the injection moulding tool, after which the friction reducing plastic is injected between the cylindrical part 11 with the flange 12 and the ball socket 14 on the slide shoe. Thus the thermal shrinking of the injected plastic material will further cause generation of a small gap between the moulded-on ball head 13 and the ball socket 14 on the slide shoe 4. This ensures that there is no constant contact pressure between the ball head 13 and the ball socket 14, so that the friction between these in relatively unloaded condition is very small. In addition, this construction causes very little risk of fatigue failure in the moulded-on material forming the ball head 13, so that failures in the moulded-on ball head are very improbable.

For example, the friction reducing layer 17 on the slide shoe, which forms among other things the sliding surface 15 and the contact surface 21, may be formed in the same injection moulding process where the ball head 13 on the piston 3 is formed. For example, this may be done by feeding plastic material into the injection moulding tool via individual inlet nozzles to the ball head 13 and the layer of friction reducing material 17 moulded on to the slide shoe 4. This will also allow use of various plastic materials for the ball head and the layer 17 moulded on to the slide shoe, whereby the properties of the single plastic materials can be optimally exploited.

For example, the friction reducing layers of plastic material may consist of high-strength thermoplastic materials based on polyaryletherketones, especially polyetheretherketones, polyamides, polyacetals, polyarylethers, polyethyleneterephthalates, polyphenylenesulphides, polysulphones, polyethersulphones, polyetherimides, polyamideimides, polyacrylates, phenol compounds such as novolaks or others. Glass, graphite, polytetrafluorethylene or carbon, especially in fibre form, can be used as filler and reinforcement. Among other things, these materials will be extremely suitable if for example water is used as pressure medium.

If the same plastic material is intended to be used both for moulding the ball head 13 and moulding on of the friction reducing layer 17, which forms the sliding surface 15 and the contact surface 21 on the slide shoe 4, an especially suitable method is described according to the invention for producing the ball-and-socket joint between the piston 3 and the slide shoe 4.

Figure 3:
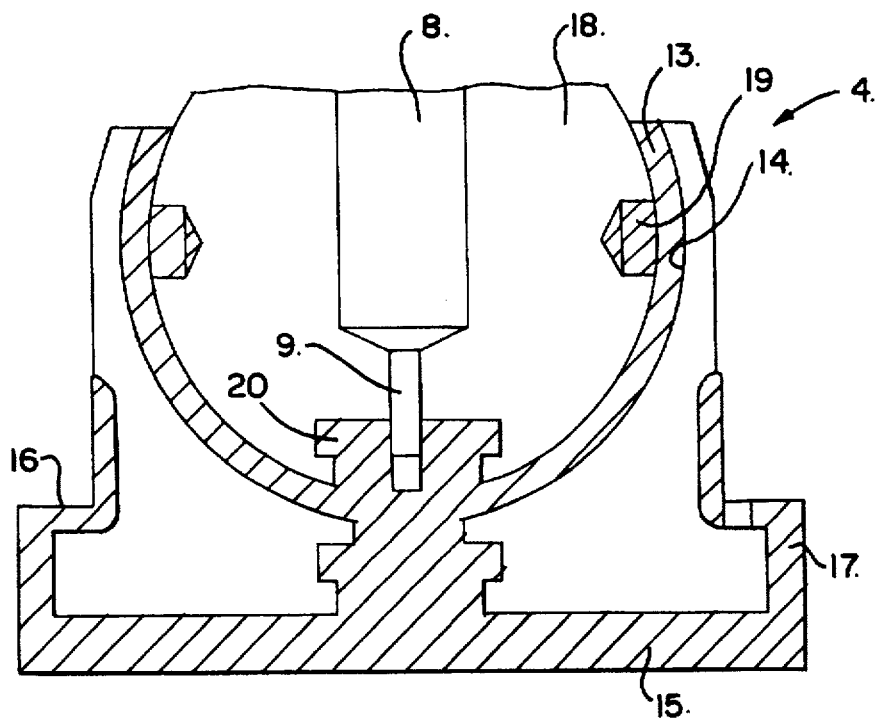
FIG. 3 is a sectional drawing of an alternative embodiment of a ball-and-socket joint for the piston with a slide shoe, here as a semimanufactured unit.
Figure 4:
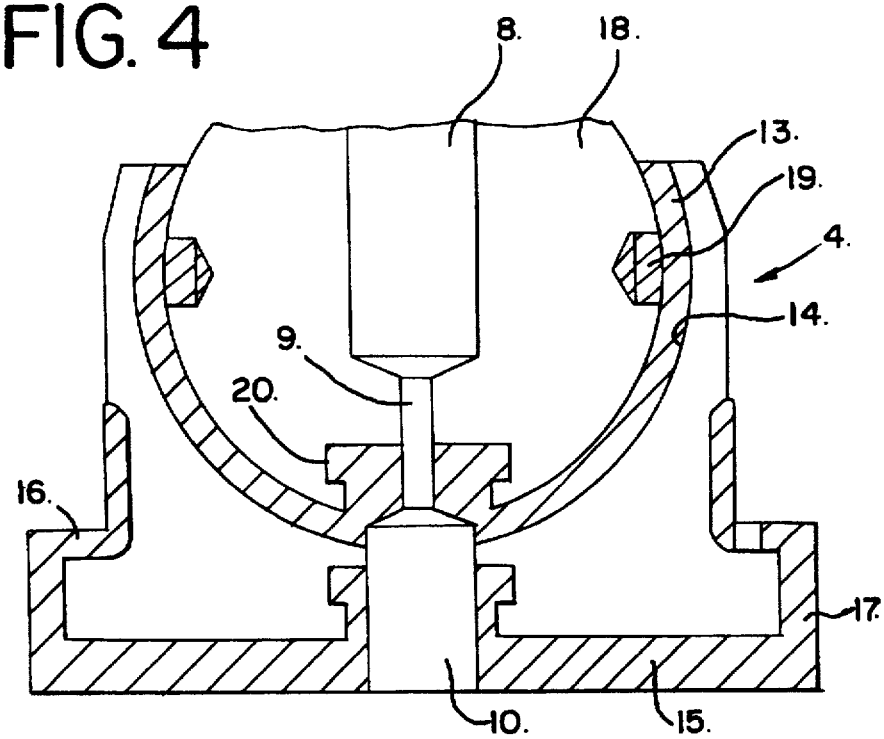
FIG. 4 shows the ball-and-socket joint according to FIG. 3, as a finished unit.

Thus in FIG. 3 it is shown how both the ball head 13 and the moulded-on layer 17 on the slide shoe 4 can be moulded as a coherent unit. By subsequent boring of the duct 10, as shown in FIG. 4, the ball head 13 and the moulded-on layer 17 on the slide shoe 4 are separated, whereby the movable ball-and-socket joint has been formed. Among other things this is advantageous in that the moulding together of the slide shoe 4 and the piston 3 is rigid, so that subsequent handling and machining are much facilitated. It is clear that the basic principle, which is shown in FIGS. 3 and 4, whereby the ball head 13 and the layer 17 of friction reducing material moulded on to the slide shoe 4 are moulded at the same time, can be carried out in other ways than the ones described, with the same advantage. It is required, however, that the injection moulding tool has a cavity in the mould which forms a connection between the cavity forming the ball head 13, and the cavity forming the moulded-on layer 17 on the slide shoe 4.

In this manner the ball head 13 and the friction reducing layer 17 on the slide shoe 4 will be moulded integrally, and therefore subsequent machining will be required for removal of the parts of the moulded body that connect the ball head 13 and the layer 17 on the slide shoe 4.

Incidentally, the embodiment shown in FIGS. 3 and 4 is different from the one shown in FIG. 2 in that the cylindrical part 11 and the flange 12, as shown in FIG. 2, have in FIGS. 3 and 4 been replaced by a ball head 18, with a diameter that permits introduction of the ball head 18 into the ball socket 14 on the slide shoe 4. In FIGS. 3 and 4 it is further shown how it is ensured that the moulded-on ball head 13 on the ball head 18 is secured by providing the ball head 18 with retaining organs 19 and 20.

It is evident that the ball head 13, which is moulded on to the piston, can be moulded on in other ways than the ones shown. For example, the ball head may be moulded on to the piston, so that the ball head is constituted of a solid, moulded-on plastic ball, or the piston may be shaped in other ways than the ones shown. It is a condition, however, that the ball head 13 is retained on the piston 3 after moulding.

In the same manner, both regarding the support body and the moulded-on layer 17, can the slide shoe may be designed in many different ways without losing the principle of the invention.

I claim:

1. A piston with a slide shoe for a hydraulic piston engine, the slide shoe comprising a ball socket and the piston being formed with a corresponding ball head, the ball socket and the ball head being connected in a ball-and-socket joint, the ball head at least partially being constituted of a spherical surface of a friction reducing material moulded onto and retained on a portion of the piston.

2. A piston with a slide shoe according to claim 1, in which the portion comprises a spherical part, on which the ball head is moulded and retained.

3. A piston with a slide shoe according to claim 1, in which the portion includes retaining organs for fixation of the ball head in relation to the piston.

4. A piston with a slide shoe according to claim 1, in which the slide shoe includes a support body which forms the ball socket, a surface of the friction reducing material being moulded on the support body covering at least a sliding surface of the slide shoe against a guide surface arranged in the piston engine, such that the support body has a free surface where it abuts on the ball head on the piston.

5. A piston with a slide shoe according to claim 4, in which the surface of friction reducing material further covers a contact surface on the slide shoe facing a retaining unit fixed in relation to the guide surface.

6. A piston with a slide shoe according to claim 4, in which the slide shoe includes a duct extending through the support body and the surface of the friction reducing material, which duct discharges into the ball socket on the support body.

7. A piston with a slide shoe according to claim 6, including a bore in the ball head of the piston extending from a discharge of the duct of the support body in the ball socket to a work side of the piston.

8. A piston with a slide shoe according to claim 4, in which the support body includes retaining organs for fixation of the moulded-on surface.

9. A method for production of a piston with a slide shoe according to claim 1, in which the piston and the slide shoe are first positioned in relation to each other, and the ball head on the piston is then completed by injection moulding of the ball head by injection of the friction reducing moulding material in a void between the portion of the piston and the ball socket of the slide shoe.

10. A method according to claim 9, in which the slide shoe is moulded on a surface of friction reducing material, a support body of the slide shoe being moulded on a surface of friction reducing material in the same injection moulding process by which the ball head on the piston is formed.

11. A method according to claim 10, in which the ball head on the piston and a moulded-on surface on the support body are injection moulded as a coherent unit, and the parts of the injection moulded body that connect the ball head on the piston and the surface on the support body are then removed.

12. A method according to claim 11, in which the slide shoe includes a duct extending through the support body, and in which the moulding material is led through the duct extending through the support body and the surface of friction reducing material either from a gap between the ball socket and the piston or the side of the support body where the moulded surface is formed to the other side, the moulding material in the duct being subsequently removed.

* * * * *